UNITED STATES PATENT OFFICE.

CARL AUER VON WELSBACH, OF VIENNA, AUSTRIA-HUNGARY, ASSIGNOR TO THE WELSBACH INCANDESCENT GAS LIGHT COMPANY, OF NEW JERSEY.

METHOD OF REGENERATING MANTLES FOR INCANDESCENT USES.

SPECIFICATION forming part of Letters Patent No. 409,529, dated August 20, 1889.

Application filed March 31, 1888. Serial No. 269,202. (No specimens.) Patented in Germany January 26, 1887, No. 44,016; in England April 28, 1887, No. 6,239, and in Austria-Hungary May 13, 1887, No. 1,663 and No. 16,176.

*To all whom it may concern:*

Be it known that I, CARL AUER VON WELSBACH, a subject of the Emperor of Austria-Hungary, residing at Vienna, Austria-Hungary, have invented new and useful Improvements in the Method of Regenerating Mantles for Incandescent Uses, (for which I have obtained Letters Patent in Great Britain, No. 6,239, dated April 28, 1887; in Germany, January 26, 1887, No. 44,016; in Austria-Hungary, May 13, 1887, No. 1,663 and No. 16,176,) of which the following is a specification.

This invention has for its object the restoration or regeneration of what are known as "mantles" in the Welsbach system of incandescent gas-lighting. These mantles are composed of various refractory earths capable of becoming incandescent when exposed to heat. The mantles are made by saturating textile material with a solution of the salts of thorium, zirconium, lanthanum, yttrium, or similar earths, either alone or in combination, and when properly shaped and dried they are heated sufficiently to burn away the textile material and leave the mantle composed of refractory earth alone. After such mantles have been used for some time, their incandescence or light-emitting property becomes impaired or lost by exposure to air and dust, and they cease giving the required degree of light. According to the present invention I obviate this difficulty by a process of regeneration, whereby the mantles are restored more or less completely to their original light-emitting power.

I have found that a mantle which has been exhausted and made inert or inactive by use or exposure to dust can be reinvigorated and rendered again useful for incandescent purposes by impregnating it with a solution of a salt of lanthanum or similar earth. Compounds rich in lanthanum oxide are particularly useful for this regenerating process, because, as found by experience, the lanthanum oxide possesses the peculiar property of increasing in its power of resisting the influence of the atmosphere the longer it is in use. The salt which I prefer to employ is lanthanum nitrate, about forty per cent., in water; but other soluble and decomposable salts of lanthanum and like salts of similar refractory earths in solution can also be employed with good results. This regenerating or revivifying solution is preferably applied by dribbling or slowly pouring a small quantity onto the upper portion of the mantle, so that it will be carried by capillary attraction throughout the earthy structure, and thereby saturate it thoroughly. This can be done, if desired, without removing the mantle from the burner. Instead of dropping the restorative solution onto the exhausted mantle, the latter can be dipped into the solution, or the solution can be applied to the mantle in the form of a spray or by means of a brush. When the restored or regenerated mantle is exposed to the action of a gas-flame, the acid of the restorative solution will be quickly burned away, thereby decomposing the salt and leaving the mantle coated with the oxide of lanthanum or other earth, and it will be found that the mantle has recovered its incandescent quality and will again give a brilliant light.

Although lanthanum oxide possesses very great light-emitting powers, it is not well adapted for use as an incandescent body by itself, but requires to be mixed with a more durable material—such as zirconium oxide or thorium oxide—to form a permanently cohering body, and I have found that such mixture possesses greater light-emitting powers than either of its constituents taken separately.

As the mantles that require regeneration afford already a comparatively strong substructure to receive the fresh coating of lanthanum oxide, the advantage is gained that for regenerating purposes compounds may be used containing a larger percentage of lanthanum oxide than could be used for forming the incandescence body itself. For the purpose of forming a regenerating-solution, decomposable salts of other refractory earths having high light-emitting powers may also be used.

In the following I will give a list of the more important bodies that may be used for regenerating mantles, giving at the same time the percentage of solid substance (in the form of nitrate) that should be contained in the regenerating-solution:

1. Lanthanum oxide, forty per cent.
2. Mixtures of thorium oxide and lanthanum oxide, (in which the latter should not be below fifty per cent.)
3. Mixtures of zirconium oxide and thorium oxide and lanthanum oxide, (in which the latter should not be below seventy per cent.)
4. Mixtures rich in lanthanum oxide and yttrium oxide, and generally all mixtures containing lanthanum oxide in various proportions.

This method of regenerating mantles makes it possible to effect a large and important saving in old and exhausted mantles which would otherwise be useless for incandescent purposes. It also affords a means for restoring or increasing the brilliancy of light in mantles that may be partly imperfect.

This process of treating mantles may also be applied to those mantles that have not decreased in their powers of emitting light, as, for instance, for the purpose of strengthening the same for transport, the final burning of the additional coating being effected after the mantle has arrived at its destination. If mantles impregnated in this way with nitrate of lanthanum, zirconium, or the like are exposed to an atmosphere of ammonia, a hydrate is formed in the pores thereof, which dries in the air to a gum-like very cohering mass, so that a mantle impregnated in this way can effectually withstand shocks or strong vibrations.

What I claim as my invention is—

1. The method of regenerating exhausted mantles composed of earthy materials for incandescent purposes, which consists in impregnating the mantle with a restorative or revivifying solution of a salt of lanthanum or other refractory earth, and heating the mantle to convert the salt into an oxide, substantially as described.

2. The method of regenerating exhausted mantles composed of earthy materials for incandescent purposes, which consists in impregnating the mantle with a restorative or revivifying solution of a salt of lanthanum, and subsequently heating the mantle to convert the salt into an oxide, substantially as described.

In testimony whereof I affix my signature in presence of two witnesses.

CARL AUER VON WELSBACH.

Witnesses:
    FRED WILLIAMS,
    EDMUND JUSSEN.